United States Patent [19]

Klee et al.

[11] Patent Number: 4,800,055

[45] Date of Patent: Jan. 24, 1989

[54] PROCESS FOR MAKING A GRANULAR PRODUCT CONTAINING SODIUM TRIPHOSPHATE

[75] Inventors: Helmut Klee, Hürth; Hans Haas, Swisttal; Werner Kowalski, Weilerswist; Theo Dahmen, Brühl, all of Fed. Rep. of Germany

[73] Assignee: Hoechst Aktiengesellschaft, Frankfurt am Main, Fed. Rep. of Germany

[21] Appl. No.: 835,894

[22] Filed: Mar. 4, 1986

[30] Foreign Application Priority Data

Mar. 18, 1985 [DE] Fed. Rep. of Germany ....... 3509661

[51] Int. Cl.$^4$ .............................................. C01B 25/30
[52] U.S. Cl. ..................... 264/118; 252/99; 252/135; 252/140; 252/174; 264/122; 423/315
[58] Field of Search ................ 264/118, 122; 252/135, 252/140, 174, 99; 423/315

[56] References Cited

U.S. PATENT DOCUMENTS

| | | | |
|---|---|---|---|
| 3,338,671 | 8/1967 | Marshall et al. | 423/315 |
| 3,356,447 | 12/1967 | Tafler | 423/315 |
| 3,446,580 | 5/1969 | Fuchs | 423/315 |
| 3,469,938 | 9/1969 | McLeod et al. | 423/315 |
| 3,931,036 | 1/1976 | Pierce | 264/118 |
| 4,251,498 | 2/1981 | Hensler et al. | 423/315 |

*Primary Examiner*—John Doll
*Assistant Examiner*—Wayne A. Langel

[57] ABSTRACT

A granular hydrated product consisting completely or partially of sodium triphosphate for use in detergent and cleaning compositions is made. To this end, pulverulent sodium triphosphate containing less than 22 wgt % water is compacted by initially mixing it with a quantity of water sufficient for hydrating at most 100% of the sodium triphosphate to the hexahydrate and then continuously admitting the resulting mixture to a zone inside which it is made into solid matter under pressure.

11 Claims, No Drawings

PROCESS FOR MAKING A GRANULAR PRODUCT CONTAINING SODIUM TRIPHOSPHATE

The present invention relates to a process for making a granulated hydrated product consisting completely or partially of sodium triphosphate ($Na_5P_3O_{10}$) for use in detergent and cleaning compositions.

Granular products of this kind, normally termed granulates, are to an increasing extent gaining interest in the production of dish washing compositions and also for the production of detergent and cleaning compositions.

It is generally desirable for these products 1. to have an apparent density between 700 and 1100 g/l;
2. not to coalesce or agglutinate on being introduced into an automatic dish washing machine or washing machine;
3. to consist of particles of high mechanical strength;
4. to have a long storage life in admixture with further constituents of detergent and cleaning compositions, especially with chlorine-yielding substances; and for the phosphate to contain
5. up to 22 wgt % water, depending on the use the product is put to.

As can be inferred from the term "granulate", the above products have heretofore been exclusively made by a granulating process using a granulating plate, drum, spray mixer, spray kneader or comparable apparatus with the use of water (e.g. in the form of a solution or suspension of a phosphate, silicate, sulfate or surfactant) as a granulating aid.

In all of these granulating processes, sodium triphosphate is hydrated to the corresponding hexahydrate in contact with the water or aqueous solution or suspension.

The water of crystallization is more or less rapidly bonded, depending on the content of high temperature modification, pyrophosphate and also the particle structure of the sodium triphosphate.

Products made by granulation often contain the water incompletely bonded as hexahydrate, which is disadvantageous. Depending on the properties aforesaid, it is possible for the product to contain more or less water just as surface water. The reason for this resides in the fact that the phosphate undergoes encrustation while forming agglomerates absorbing water superficially only. In other words, additional water is prevented from penetrating into the interior of the agglomerate and from being fixed as water of crystallization.

Water incompletely bonded as hexahydrate impairs the storability of the product which in fact coalesces and also impairs the chlorine stability. In addition, the dissolution behaviour is affected. In other words, the products so made are liable to coalesce and form material greatly handicapping the washing or dish washing operation or even making it impossible upon their being introduced into a washing or dish washing machine.

Still further, the granular products made by a granulating or mixing method have apparent densities which normally vary between 500 and 700 g per liter. Higher apparent densities of about 1000 g/l which are normally needed cannot practically be reached by the above methods.

It should be added that the particles forming these granulates commonly have an unsatisfactory mechanical strength, and normally fail to withstand the stron mechanical stresses they are put to during production, storage and work up. The particles become partially destroyed and this adds to increasing the proportions of dusty material.

The present invention now unexpectedly provides a process which permits the adverse effects of the prior art methods to be avoided and a product having the properties set forth hereinabove to be produced. To this end, the process of this invention provides for pulverulent sodium triphosphate containing less than 22 wgt % water to be compacted, alone or in admixture with at least one further pulverulent constituent of a detergent or cleaning composition, by initially mixing the sodium triphosphate feed material with a quantity of water sufficient for hydrating at most 100% of the sodium triphosphate to the hexahydrate and then continuously admitting the resulting mixture to a zone inside which it is made into solid matter under pressure between two structural elements running oppositely with respect to one another, and ultimately crushing the solid material to desired fineness, and separating material having the fineness targeted from oversized and undesired particles.

Sodium triphosphate containing up to 100 wgt % phase-I material and/or less than 5.0, preferably 0.1–0.5 wgt %, water of crystallization, is preferably used as the feed material in the above process, whilst the said further pulverulent constituent of the detergent or cleaning composition should conveniently be selected from materials commonly used for that purpose, namely from sodium sulfate, sodium metasilicate, zeolies and alkali metal salts of dichloroisocyanuric acid. The pulverulent feed materials should preferably have a particle size of less than 0.3 mm. It is also preferable for the feed materials to be compacted using a roller press; the gap left between the rollers should be 0.2–2.9 mm wide and the feed material should be compacted under a linear pressure of 10,000–20,000 kN per cm roller length.

It is good practice to mix the water with the sodium triphosphate or the mixture of sodium triphosphate and the further constituent(s) of the detergent or coating composition in a conventional standard mixer, e.g. a drum or premixer, over a period as long as necessary to at least partially hydrate the sodium triphosphate.

The step of compacting the feed material can be effected in standard apparatus of the kind widely used for other purposes.

It is however advantageous to use a roller press and to compact the dry feed product or feed product mixture containing more or less water of crystallization to platelets between two rollers under an adjustable compacting pressure. Next, the platelets are crushed to desired fineness and the particles having the fineness targeted are separated from oversized and undersized particles.

As regards the gap to be left between the rollers and the quantity of material to be admitted to the roller press, it is necessary for them, conditional upon the pressure necessarily to be selected for obtaining particles having the mechanical strength targeted, to be so balanced against one another that the platelets initially obtained have a thickness corresponding approximately to the diameter targeted for the crushed or ground particles. This permits material regular in particle size to be obtained and the formation of scaly material to be obviated.

The material to be compacted should conveniently be distributed as regularly as possible across the entire width of the rollers in order to reduce its tendency to slip sideways.

The platelets should conveniently be comminuted in a sieve crusher forcing the compacted material through a sieve with meshes of a given size determining the particle size of the final product.

Next, the crushed material having the size targeted is separated from oversize and undersize particles in conventional oscillatory sieves. Regularly granulated final products are obtained in this way. The oversized and undersized particles coming from the sieving station are recycled into a reservoir ahead of the press.

Mixtures of sodium triphosphate e.g. with a metasilicate or sulfate, are normally made by initially mixing the feed materials in a suitable mixer, e.g. a screw or drum, and then admitting the mixture to the reservoir ahead of the press.

The products made by the process described hereinabove have a strongly compacted surface and do substantially not coalesce on being dissolved or suspended in water. The material has a structure resembling "roes" which it initially retains substantially on being introduced into water, and it is indeed easy to wash out from the chambers of a washing or rinsing machine. It resolves later into a pasty mass which dissolves without coalescence. The products also have a particle strength comparing very favorably with the particle strength of granulate made heretofore.

In the product made in accordance with this invention, the water contained in it is completely linked as hexahydrate. The heat evolved under the compacting pressure causes still incompletely fixed water, if any, in the phosphate/water-mixture, to undergo evaporation or "forces" it to go into the interior of the particle. Apart from fixed water of crystallization, the solid particles have a completely dry surface. The product made by this invention is finally free from the disadvantages noted hereinabove for products made by a granulating method.

The following Examples illustrate the invention which is naturally not limited thereto. The percentages are by weight unless otherwise stated.

EXAMPLE 1

5000 kg commercial sodium triphosphate containing 91.8% $Na_5P_3O_{10}$, 53% phase-I and 0.2% water was mixed with 600 kg water in a premixer provided with rotating blades on a vertical shaft. The moist and warmed material was placed in a reservoir and then introduced into the gap left between two rollers rotating in opposite directions, using two feed screws. The gap was 1.8 mm wide and the compacting pressure was 16,000 kN per cm roller length. Phosphate platelets came from the roller gap; they were dropped on to a conveyor belt therebelow and crushed to slightly bent fragments variable in size, from mark-piece to palm size.

Next, the platelets were given into a toothed crusher, crushed therein and placed on to a bi-plane oscillating sieve with meshes 0.2 and 1.2 mm wide, respectively.

3240 kg granular sodium triphosphate with a particle size of 0.2–1.2 mm was obtained. The yield was 57.8%, based on the phosphate/water-mixture used. The balance of the material was recycled to the feed reservoir ahead of the press.

The product and material recycled contained 8.5% water. As results, 2.2% water was evaporated during the mixing and compacting operations.

The screeen analysis of the final product was as follows:

| | |
|---|---|
| <0.1 mm | 0.1% |
| 0.1–0.2 mm | 0.3% |
| 0.2–0.4 mm | 9.7% |
| 0.4–0.74 mm | 50.4% |
| 0.75–1.2 mm | 39.6% |
| >1.2 mm | 0.1% |
| Apparent density | 1060 g/l |

10 g product was introduced into 500 ml wate;r the phosphate remained initially granular and dissolved later with agitation while forming a clear solution.

50 g product was placed in a drum cylinder having a capacity of 1000 ml and a diameter of 100 mm. Next, 4 steel balls each of which has a weight of 50 g were placed in the drum which was then caused to rotate over a period of 240 seconds at a speed of 40 rpm. The product was then taken from the drum and sieved on a screen having meshes 0.1 mm wide.

7.8 g fines with a size of less than 0.1 mm were obtained. In other words, 82.2% break-resistant material was obtained.

50 g material produced in conventional manner by granulation which contained 9.2% $H_2O$ and had an apparent density of 7.30 g/l was subjected to the drum test described above, for the purpose of comparison, 49.9% break-resistant material was obtained.

EXAMPLE 2

5000 kg sodium triphosphate which contained 3.1% water, 66.0% phase-I and 98.2% $Na_5P_3O_{10}$ was mixed in a premixer with 1280 kg water and the mixture was given on to a roller press. The press was operated under a linear pressure of 12 000 kN per cm roller length and the roller gap was 1.5 mm. The compressed material was crushed and sieved on a bi-plane screen with meshes 0.2 and 1.2 mm wide, respectively. Final product consisting of particles with a size of 0.2–1.2 mm was obtained in a yield of 66.2%. The balance was recylced.

| Screen analysis: | |
|---|---|
| <0.1 mm | 0.1% |
| 0.1–0.2 mm | 0.4% |
| 0.2–0.4 mm | 8.3% |
| 0.4–0.75 mm | 49.6% |
| 0.75–1.2 mm | 41.7% |
| >1.2 mm | <0.1% |
| Apparent density: | 999 g/l |

The final product and material recycled contained 19.8% water i.e. 3.0% less than would have been expected theoretically, considering the water added. The difference is due to evaporation of water during the treatment the material was subjected to.

The product was dissolved in water; it initially remained granular, then resolved into a soft pasty mass and ultimately dissolved while forming a clear solution.

86.4% was resistant to abrasion in the drum test.

EXAMPLE 3

3000 kg sodium triphosphate which contained 13% phase-I, 0.2% $H_2O$ and 97.9% $Na_5P_3O_{10}$ was mixed with 2000 kg commercial anhydrous sodium metasilicate in a double paddle screw mixer and the mixture was blended with 650 kg H₂O in a premixer.

Next, the mixture was compressed on a roller press under a linear pressure of 18,000 kN/cm at a roller gap of 2 mm. The compressed material was then crushed and sieved. The double screen had meshes 0.6 and 1.6 mm wide, respectively.

3940 kg final granular product consisting of particles with a size of 0.6–1.6 mm or 69.7%, based on the feed materials (including water) was obtained.

| Screen analysis: | |
|---|---|
| <0.4 mm | <0.1% |
| 0.4–0.74 mm | 21.6% |
| 0.75–1.2 mm | 43.2% |
| 1.2–1.6 mm | 35.2% |
| >1.6 mm | <0.1% |
| Apparent density: | 1005 g/l |

The product contained 9.1% water.

Dissolution behaviour. On being introduced into water, the product resolved into a paste which dissolved into a liquid rendered turbid by silicate.

86.6% was break-resistant

EXAMPLE 4

Dish washing compositions were prepared as follows:

(1) 90% phosphate, prepared as described in Example 1 of this invention with 8.5% H₂O
   5% sodium carbonate
   2.5% non-ionic surfactant
   2.5% sodium dichloroisocyanurate
(2) 90% phosphate, prepared as described in Example 2 of this invention with 19% H₂O
   5% sodium carbonate
   2.5% non-ionic surfactant
   2.5% sodium dichloroisocyanurate
(3) 90% phosphate/metasilicate-mixture, prepared as described in Example 3 of this invention
   5% sodium carbonate
   2.5% non-ionic surfactant
   2.5% sodium dichloroisocyanurate
(4) 90% commercial phosphate granulate containing 8% H₂O
   5% sodium carbonate
   2.5% non-ionic surfactant
   2.5% sodium dichloroisocyanurate
(5) 45% commercial phosphate granulate containing 8% H₂O
   45% metasilicate
   5% sodium carbonate
   2.5% non-ionic surfactant
   2.5% sodium dichloroisocyanurate The above dish washing compositions were stored over a period of several months under standard conditions customary in commerce and the degradation of active chlorine in the compositions was determined.

The following results were obtained:

TABLE

| Composition | % Cl-degradation after months | | | |
|---|---|---|---|---|
| | 1 | 2 | 3 | 6 |
| 1 | 1.2 | 9.3 | 12.2 | 24.3 |
| 2 | 3.3 | 10.8 | 11.5 | 26.5 |
| 3 | 1.8 | 10.0 | 12.2 | 26.5 |
| 4 | 6.3 | 12.2 | 20.8 | 41.5 |
| 5 | 8.6 | 13.8 | 19.3 | 37.5 |

We claim:

1. In the process for making a hydrated product consisting completely or partially of sodium triphosphate for use in detergent and cleaning compositions by initially mixing pulverulent sodium triphosphate containing less than 22 wt.-% water, alone or in admixture with at least one further pulverulent constituent of the detergent or cleaning composition, with water for hydrating the sodium triphosphate and compressing the mixture obtained; the improvement which comprises premixing a sodium triphosphate containing at least 91.8 wt.-% $Na_5P_3O_{10}$ having a phase-I content of at least 13 wt.-% and a particle size smaller than 0.3 mm with a quantity of water sufficient for hydrating the sodium triphosphate to a water content from about 8.5 to at most 22 wt.-%; admitting continuously the mixture obtained to a roller press; compressing in it the mixture under a linear pressure of 10,000–20,000 KN per cm roller length to a solid sheet and ultimately crushing the said solid sheet to desired fineness with the resultant formation of a dry final product having a content of water of crystallization from 13 to 22 wt.-%, a high abrasion resistance and a bulk density of from 700 to 1100 g/l.

2. The process as claimed in claim 1, wherein said bulk density is at least about 1000 g/l.

3. The process as claimed in claim 1, wherein sodium triphosphate containing less than 5.0 wgt % water is used.

4. The process as claimed in claim 3, wherein sodium triphosphate containing from 0.1–0.5 wgt % water of crystallization is used.

5. The process as claimed in claim 1, wherein the said further pulverulent constituent of the detergent or cleaning composition is selected from sodium sulfate, sodium metasilicates, zeolites, or alkali metal salts of dichloroisocyanuric acid.

6. The process as claimed in claim 1, wherein the gap left between the rollers of the roller press is 0.2 to 2.0 mm wide.

7. The process as claimed in claim 1, wherein the water is mixed with the sodium triphosphate or the mixture of triphosphate and said further constituents of the detergent or cleaning composition in a mixer over as long a period as necessary to at least partially hydrate the sodium triphosphate to the hexahydrate.

8. In the process for making a hydrated product consisting completely or partially of sodium triphosphate for use in detergent and cleaning compositions by initially mixing pulverulent sodium triphosphate containing less than 22 wt.-% water, alone or in admixture with at least one further pulverulent constituent of the detergent or cleaning composition, with water for hydrating the sodium triphosphate and compressing the mixture obtained; the improvement which comprises premixing a feed material comprising sodium triphosphate consisting essentially of $Na_5P_3O_{10}$ and having a water od crystallization content less than 5 wt.-% and a particle size smaller than 0.3 mm with a quantity of water sufficient to increase the water content of the resulting mixture relative to the feed material and the water of crystallization content of the compressed product, relative to the feed material; admitting continuously the said resulting mixture to a roller press; compressing said resulting mixture in the roller press under a linear pressure of 10,000–20,000 KN per cm roller length to a solid sheet, whereby any incompletely fixed water in the thus-compressed mixture is essentially completely linked as hexahydrate, and ultimately crushing the said solid sheet to desired fineness with the resultant formation of a dry final product whose water content is essentially completely in the form of water of crystallization, said dry final product having an apparent density between 700 and about 1100 g/l.

9. The process as claimed in claim 8, wherein the dry final product is abrasion-resistant and has an apparent density of at least about 1000 g/l.

10. The process as claimed in claim 9, wherein the abrasion-resistant dry final product has an apparent density of 999 to 1060 g/l.

11. The process as claimed in claim 9, wherein the feed material consists essentially of at least 91.8 wt.-% $Na_5P_3O_{10}$ and has a water od crystallization content less than about 0.5 wt.-%, said $Na_5P_3O_{10}$ having a phase-I content of at least 13 wt.-%, but the water content of the dry final product is at least about 8.5 wt.-%, essentially entirely as water of crystallization of $Na_5P_3O_{10}$ hexahydrate.

* * * * *